United States Patent
Ungerecht

(10) Patent No.: US 8,714,186 B2
(45) Date of Patent: May 6, 2014

(54) PRESSURE REGULATOR HOUSING ASSEMBLY

(75) Inventor: Cliff Paul Ungerecht, Walla Walla, WA (US)

(73) Assignee: Nelson Irrigation Corporation, Walla Walla, WA (US)

(*) Notice: Subject to any disclaimer, the term of this patent is extended or adjusted under 35 U.S.C. 154(b) by 398 days.

(21) Appl. No.: 13/047,946

(22) Filed: Mar. 15, 2011

(65) Prior Publication Data

US 2011/0226347 A1   Sep. 22, 2011

Related U.S. Application Data

(60) Provisional application No. 61/314,450, filed on Mar. 16, 2010.

(51) Int. Cl.
*F16K 27/02*  (2006.01)
*G05D 16/06*  (2006.01)

(52) U.S. Cl.
USPC ............ 137/315.05; 137/505.25; 137/505.28

(58) Field of Classification Search
USPC ............ 137/315.04, 315.05, 505.25, 505.28; 285/91, 92, 330
See application file for complete search history.

(56) References Cited

U.S. PATENT DOCUMENTS

| | | | |
|---|---|---|---|
| 3,865,137 A * | 2/1975 | Chvatal | 137/613 |
| 4,692,565 A | 9/1987 | Koht et al. | |
| 4,801,158 A * | 1/1989 | Gomi | 285/52 |
| 5,118,120 A | 6/1992 | Drerup et al. | |
| 5,724,816 A | 3/1998 | Ritter et al. | |
| 5,881,757 A * | 3/1999 | Kuster et al. | 137/15.19 |
| 6,164,656 A | 12/2000 | Frost | |
| 6,334,310 B1 | 1/2002 | Sutcu et al. | |
| 6,427,446 B1 | 8/2002 | Kraft et al. | |
| 7,048,001 B2 | 5/2006 | Youngberg et al. | |
| 7,140,595 B2 | 11/2006 | Youngberg et al. | |
| 7,370,667 B2 | 5/2008 | Sesser et al. | |
| 7,401,622 B2 | 7/2008 | Ungerecht | |
| 2008/0007008 A1 | 1/2008 | Hoebel et al. | |

* cited by examiner

*Primary Examiner* — Stephen M Hepperle
*Assistant Examiner* — Kevin Barss
(74) *Attorney, Agent, or Firm* — Nixon & Vanderhye P.C.

(57) ABSTRACT

A pressure regulator housing assembly includes a lower housing and an upper housing; a plunger and diaphragm assembly supported within the lower and upper housings, the plunger movable toward and away from a valve seat. The diaphragm has a radially inner edge fixed to one end of the plunger and a radially outer edge clamped between an annular surface within said upper housing and a surface of a clamp ring locked against rotation relative to said upper housing thereby isolating said diaphragm from any contact with the lower housing. Upon assembly of the upper and lower housings requiring relative rotation therebetween, an upper edge of the lower housing is engaged by a lower surface of the clamp ring.

18 Claims, 9 Drawing Sheets

PRESSURE REGULATOR HOUSING ASSEMBLY

RELATED APPLICATION

Priority is claimed from provisional application Ser. No. 61/314,450, filed Mar. 16, 2010, the entirety of which is incorporated herein by reference.

This invention relates to valves and pressure regulators generally, and specifically, to a housing assembly for axial-flow fluid pressure regulators particularly suited for use in agricultural irrigation systems.

BACKGROUND OF THE INVENTION

It is well known to use pressure regulators in irrigation systems in order to provide substantially constant, regulated outlet pressure over a wide range of regulator inlet pressures, to thereby insure, for example, that a supply of water to a sprinkler or other irrigation device is maintained at a substantially uniform pressure. The need for such regulators is particularly acute in low pressure systems because even slight variations in pressure may cause much greater variations in water delivery than the same system operating at high pressure.

The assignee of this invention currently manufactures and sells fluid pressure regulators of the flow-through type, having an inlet at one end of a tubular housing and an outlet at the other end of the tubular housing. A valve or regulator seat is fixed within the housing and is adapted to be engaged by a tubular plunger which is spring-biased away from the seat (i.e., in the direction of fluid flow) so that under normal conditions, maximum flow through the regulator is permitted. In the event of a pressure surge, the plunger is moved by back pressure within a diaphragm chamber, against the action of an opposed coil spring (and against atmospheric pressure), toward the regulator seat to thereby decrease flow through the regulator until the pressure is reduced, at which point the plunger will stop or, if pressure decreases sufficiently, move upwardly away from the seat to thereby increase the flow. In this way, the regulator constantly seeks an equilibrium position to thereby maintain a substantially uniform outlet pressure. See, for example, U.S. Pat. Nos. 7,048,001; 5,875,815; and 5,257,646.

In a typical regulator assembly, the internal diaphragm is engaged and held in place by a cap (or components within the cap) or upper housing that is fastened to the housing body or lower housing. Typically, the cap is secured to the housing body (or lower housing) by four circumferentially-arranged screws. This method of fastening is advantageous in that the cap does not rotate relative to the housing during assembly, and thus, the exposed diaphragm edge is not disturbed. There is a disadvantage, however, in that assembly equipment designed to simultaneously apply and tighten plural screws is expensive and complex. There remains a need, therefore, for a pressure regulator housing coupling arrangement that is of relatively simple design which facilitates the assembly process without damaging the otherwise fragile regulator diaphragm.

BRIEF DESCRIPTION OF THE INVENTION

Initially, it is noted that any reference herein to "upper", "lower", "vertical" or "horizontal" edges or other surfaces of the regulator cap and/or housing is made with respect to the orientation of the regulator as shown in FIG. 1, and is not intended to be limiting in any way, recognizing that the installed orientation of the regulator may be different from that shown in FIG. 1.

In one exemplary but nonlimiting example, the invention relates to a pressure regulator housing and internal stem and diaphragm assembly that eliminate the need for screws or other discrete fasteners in favor of a rotating bayonet-type attachment to secure the cap to the housing. At the same time, the diaphragm edge is supported in such a way that it rotates with the regulator cap on assembly, so that there is no relative rotation between the cap and the diaphragm, and no contact between the diaphragm and the housing, thus eliminating any concern for damage to the diaphragm during assembly.

More specifically, an internal regulator plunger or stem has an upper radial flange which supports a radially inner edge of the diaphragm, clamped between an annular, inner clamp ring and the flange. An annular outer clamp ring is adapted to be received over the plunger and engage the outer edge of the diaphragm. The outer clamp ring is formed with a plurality of relatively closely-spaced teeth projecting radially outwardly from its peripheral edge. An internal wall portion of the cap is formed with a plurality (six in the illustrated example) of relatively widely circumferentially spaced teeth or lugs that project radially inwardly, so that when the outer clamp ring is located over the outer edge of the diaphragm, the teeth on the internal cap wall will naturally "find" and engage selected ones of the teeth on the outer clamp ring. With the outer diaphragm edge sandwiched between an internal radially-oriented, annular surface of the cap and the outer clamp ring, the diaphragm is fixed relative to the cap so that on assembly, the diaphragm will rotate with the cap. In addition, the upper edge of the housing will engage a smooth underside of the outer clamp ring, such that no part of the diaphragm is engaged by the housing. In this way, no torque or twisting force is applied to the diaphragm during assembly of the cap to the housing.

The cap or upper housing and the regulator body or lower housing are formed with cooperating surface features that enable a bayonet-type attachment where the cap is axially-aligned with and telescoped over the upper edge of the housing, and then rotated into locking engagement. More specifically, in the illustrated embodiment, the lower skirt portion of the cap is formed to include on its interior peripheral surface a plurality of circumferentially-spaced locking pads. In the illustrated example, the locking pads are substantially square in shape with a relatively sharp edge on one vertical side thereof, and a sloped or ramped edge on the opposite vertical side thereof. The locking pads are flush with the lower edge of the cap skirt, and are generally axially-aligned with the lugs formed on the interior of the cap, although they need not be so aligned.

The outer peripheral surface of the housing at the upper edge thereof is formed with a plurality of circumferentially-spaced cam platforms, each defined by a cam surface that increases in diameter along a generally arcuate surface extending from a relatively flat base portion to a sharp axial alignment edge. A lower portion of the cam surface for each cam platform is cut out to form a locking recess, located proximate the sharp alignment edge, the locking recess sized and shaped to receive a corresponding locking pad on the inside of the cap as described above. There is a locking recess in the housing for each locking pad on the cap. The circumferential space between the edge of the locking recess and the sharp alignment edge associated with that cam surface is taken up by a relatively small, axially-extending, rib that has an axially-oriented ramped surface on one side, along the locking recess and a sharp vertical edge on its other side, in alignment with, and becoming part of the sharp alignment edge. The ramped surface on the rib may be included to permit an "over-ride" of the locked arrangement as described further herein.

When the cap and housing are ready for assembly, with the plunger, diaphragm and outer clamp ring properly located, the cap may be telescoped over the housing when the sharp edges of the locking pads are substantially aligned with (but slightly offset from) the sharp alignment edges of the plural cam platforms. Upon full insertion of the housing upper end into the cap, the cap may be rotated such that the locking pads ride over the cam surfaces of the cam platforms and snap or click into the corresponding locking recesses, with the sharp edges of the respective locking pads and locking recesses preventing any back-rotation of the cap. At the same time, the engagement of upper horizontal edges on the locking pads with upper horizontal edges of the locking recesses prevents relative axial movement between the cap and the housing.

As already mentioned, during this relative rotation of the cap and housing, no torque or twisting forces of any kind are exerted on the diaphragm.

Accordingly, in one exemplary but nonlimiting aspect, the invention provides a pressure regulator housing assembly comprising a lower housing and an upper housing; a plunger and diaphragm assembly supported within the lower and upper housings, the plunger movable toward and away from a valve seat, and the diaphragm having a radially inner edge fixed to one end of the plunger and a radially outer edge clamped between an annular surface within the upper housing and a surface of a clamp ring locked against rotation relative to the upper housing thereby isolating the diaphragm from contact with the lower housing; wherein, upon assembly of the upper and lower housings requiring relative rotation therebetween, an upper edge of the lower housing is engaged by a lower surface of the clamp ring.

In another exemplary but nonlimiting aspect, the invention provides a pressure regulator housing assembly comprising a lower housing and an upper housing adapted for assembly via axial engagement and relative rotation; a plunger and diaphragm assembly supported within the lower and upper housings, the plunger movable toward and away from a valve seat, and the diaphragm having a radially inner edge fixed to one end of the plunger and a radially outer edge clamped between an annular surface within the upper housing and a surface of a clamp ring; wherein an outer peripheral surface of the clamp ring is formed with a first plurality of vertically-oriented, tapered teeth and an inner peripheral wall portion of the upper housing adjacent the annular surface is formed with a second plurality of vertically-oriented teeth engageable, on assembly, with the first plurality of vertically-oriented teeth thereby locking the clamp ring against rotation relative to the upper housing; and further wherein an inner peripheral surface of the upper housing is formed with circumferentially-spaced locking pads and an outer peripheral surface of the lower housing is formed with circumferentially-spaced locking recesses which, on axial assembly of the upper housing over the lower housings, are offset from the circumferentially-spaced locking pads and which upon relative rotation between the upper and lower housings, are seated in the circumferentially-spaced locking recesses to thereby lock the upper housing to the lower housing, and wherein during the relative rotation, the diaphragm rotates with the upper housing and an upper edge of the lower housing is engaged by a lower surface of the clamp ring.

In still another exemplary but nonlimiting aspect, the invention provides a pressure regulator housing assembly comprising a housing including an upper housing portion and a lower housing portion configured for attachment by axial engagement and relative rotation; a plunger and diaphragm assembly supported within the housing, an outer rim of the diaphragm isolated from any torque forces applied during assembly of the upper and lower housing portions.

The invention will now be described in connection with the drawings identified below.

DETAILED DESCRIPTION OF THE INVENTION

Figure 1:
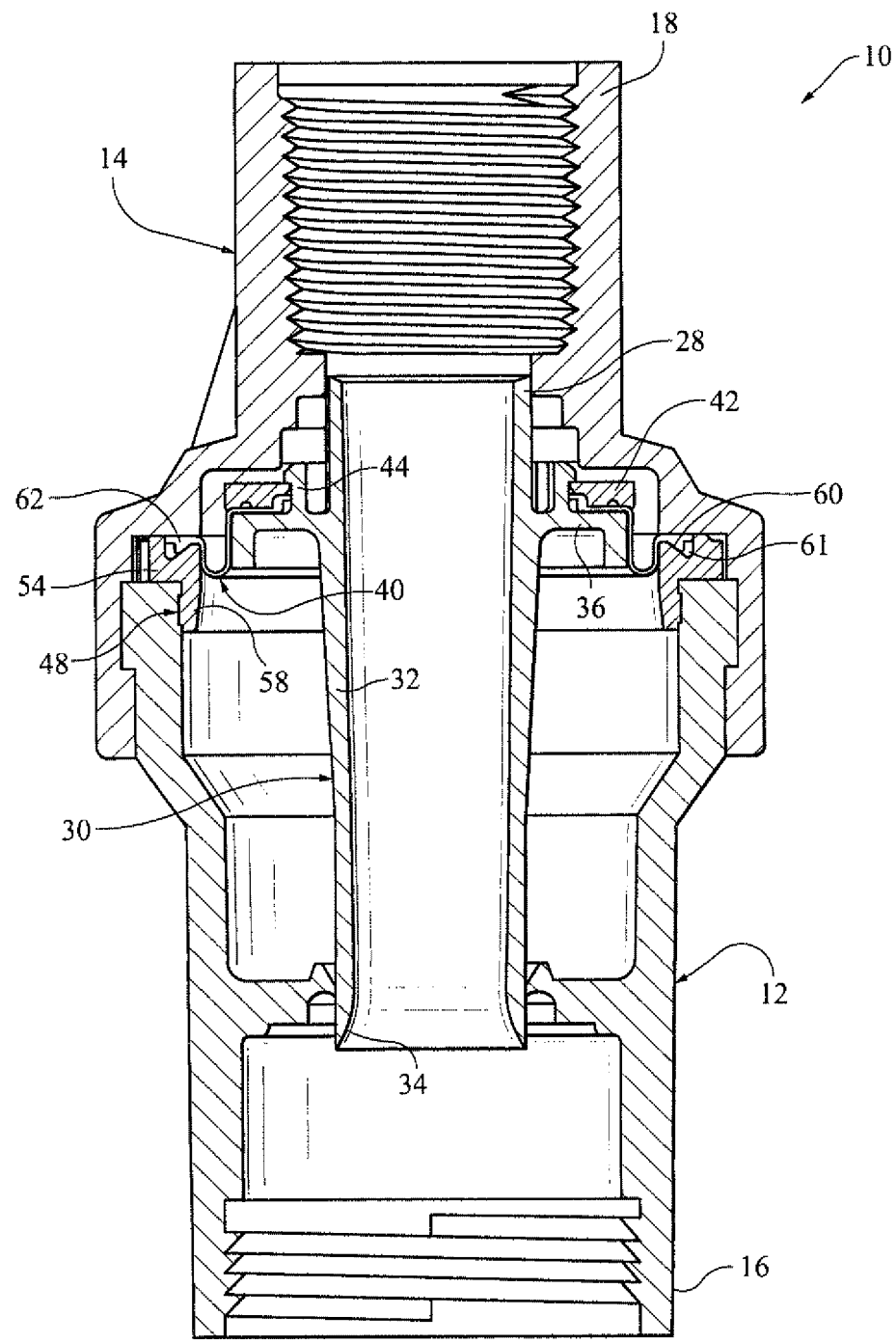
FIG. 1 is a cross section of a pressure regulator assembly in accordance with an exemplary but nonlimiting embodiment of the invention.
Figure 2:
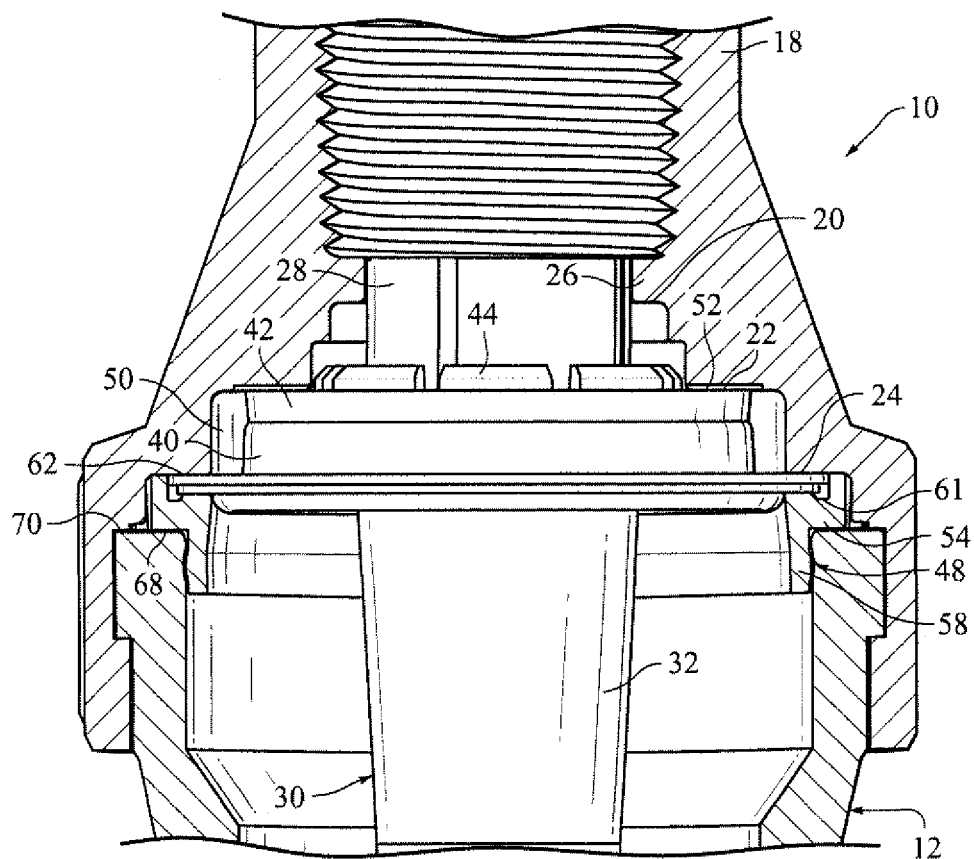
FIG. 2 is an enlarged detail of the attachment between the regulator cap and housing portions of the assembly shown in FIG. 1.

With reference to FIGS. 1 and 2, a fluid pressure regulator housing assembly 10 in accordance with an exemplary but nonlimiting embodiment includes a hollow lower housing 12 and a hollow upper housing or cap 14. Both housing and cap components are internally threaded at their respective inlet and outlet ends, 16, 18, permitting the regulator to be secured in-line between, for example, a sprinkler at the outlet end and a supply hose at the inlet end.

The interior of the cap is counterbored to form a series of at least the annular shoulders 20, 22 and 24, the purposes for which will be described further herein. It is noted initially that the shoulder 20 defines an internal diameter section 26 of the cap, adjacent the internal threads at the cap outlet 18, which receives the upper end 28 of a plunger-diaphragm assembly 30.

Figure 3:
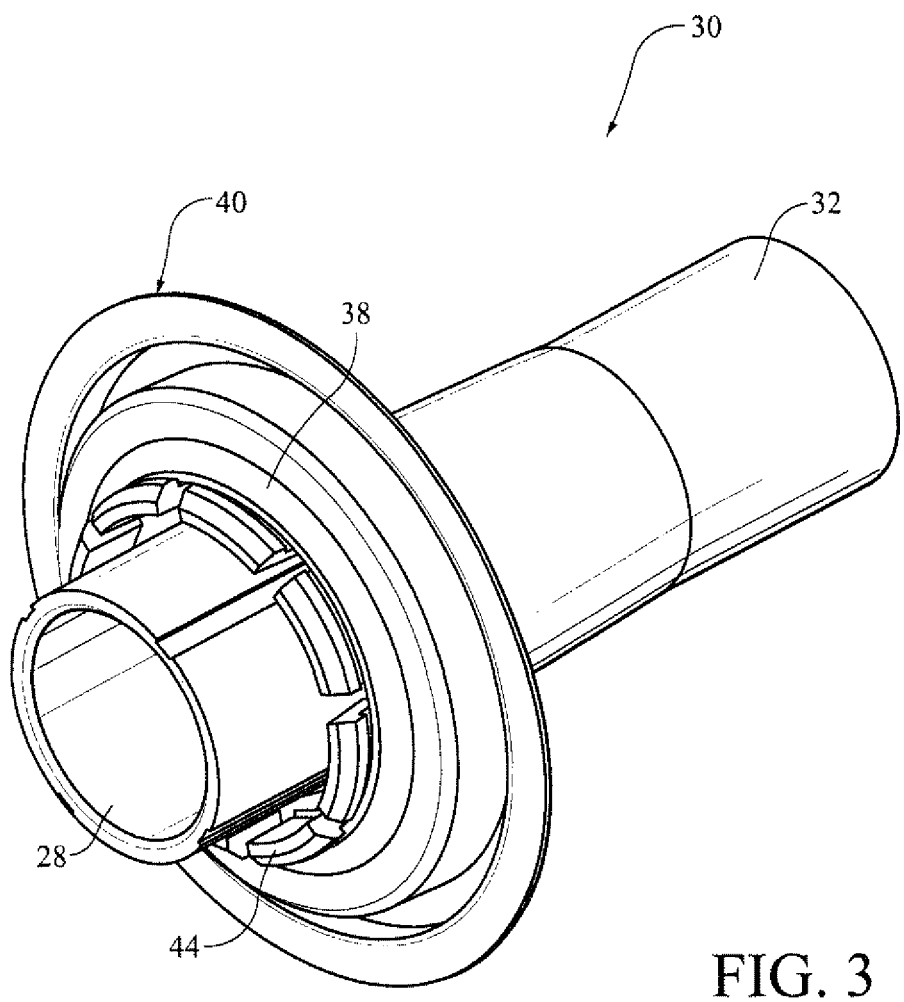
FIG. 3 is a top, right perspective view of a regulator plunger and diaphragm assembly removed from the regulator housing assembly of FIG. 1.
Figure 4:
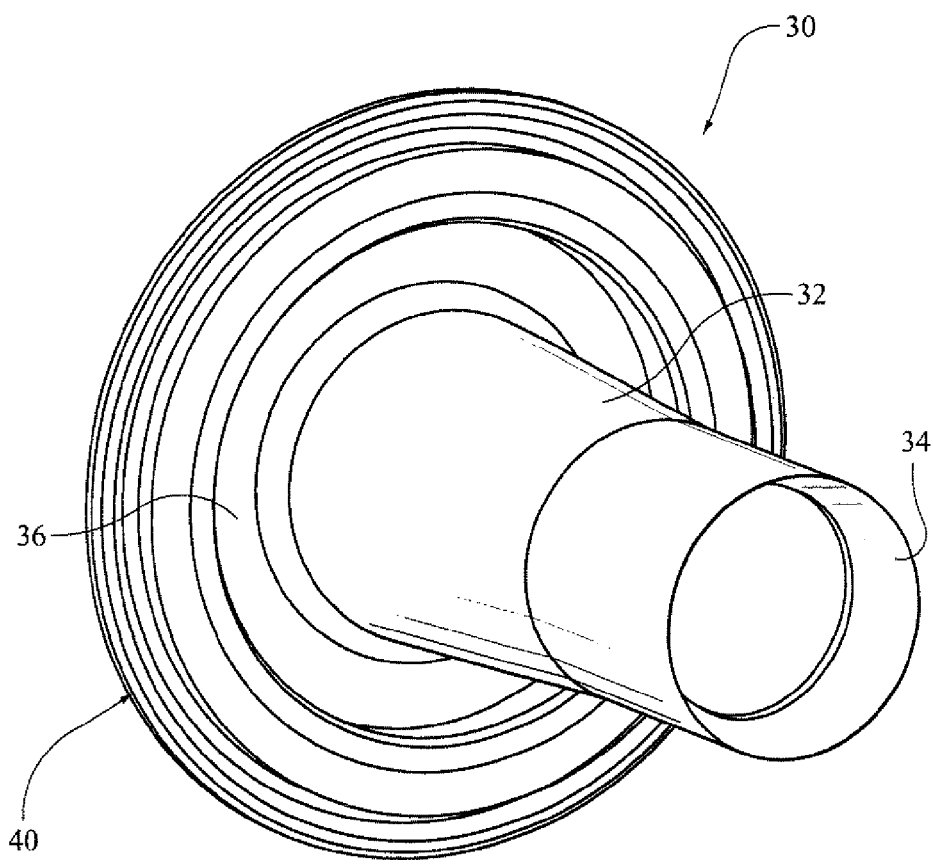
FIG. 4 is a bottom left perspective view of the regulator plunger and diaphragm assembly shown in FIG. 2.

Before describing the manner in which the cap 14 and housing 12 are attached, a more detailed description of the plunger-diaphragm assembly 30 will be provided for ease of understanding. As best seen in FIGS. 3 and 4, the plunger-diaphragm assembly 30 includes a tubular plunger 32 having a tapered lower edge 34 (FIGS. 1 and 4) forming a valve for interaction with a valve seat (not shown) supported in the housing 12. The plunger 32 is provided adjacent the upper or outlet end 28 thereof (flow is from bottom to top as viewed in FIG. 1) with a radial flange 36 (FIGS. 1 and 4). A radially inner edge 38 of an annular "rolling" diaphragm 40 is supported on the flange 36 and is clamped between the flange and a rigid inner clamp ring 42 (FIGS. 1 and 2) snap-fit over an array of upstanding spring fingers 44 that extend upwardly from the flange 36, as best appreciated from FIG. 1. The inner clamp ring 42 is adapted to engage the shoulder 22 of the cap when the plunger 32 is in its fully raised position as shown in FIGS. 1 and 2. The intermediate portion of the diaphragm assumes a substantial U-shape (FIG. 1) when the plunger 32 is in the raised position, and the radially outer edge 62 of the diaphragm 40 is held between shoulder 24 of the cap and an outer clamp ring 48 described further below.

While the operation of the regulator forms no part of this invention, it will be appreciated that the plunger 32 moves up and down within a limited range of movement as a function of outlet pressure (i.e., the pressure at the outlet end 18), noting that the inner clamp ring 42 and flange 36 are located in a diaphragm chamber 50 (FIG. 2) which is exposed to outlet pressure due to the presence of radial slots or grooves 52 (FIG. 2) formed in the shoulder 22 that connect to the diaphragm chamber 50. When the outlet pressure is high, the pressure in the diaphragm chamber 50 causes the plunger 32 including the tapered lower edge or valve 34 to move downwardly toward the valve seat to restrict flow. As the outlet pressure decreases, the plunger 32 (under the action of a spring, not shown) will move upwardly, increasing flow past the valve seat. Thus, the plunger 32 is always seeking equilibrium as it maintains a substantially uniform outlet pressure. For more details regarding the operation of regulators of this type, see U.S. Pat. Nos. 7,048,001; 5,875,815; and 5,257,646.

Figure 5:
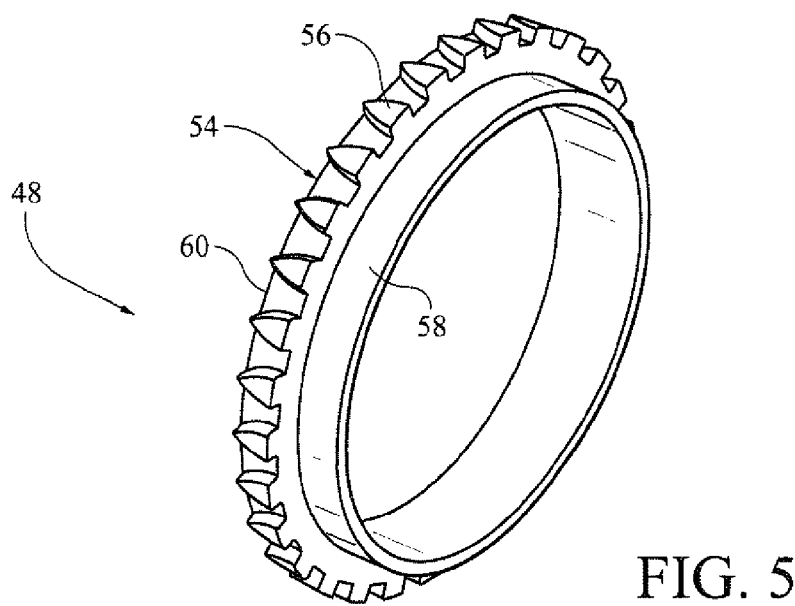
FIG. 5 is a perspective view of an annular diaphragm clamp ring removed from the regulator housing assembly of FIG. 1.

With reference now to FIG. 5, the outer clamp ring 48 is formed with an upper flanged portion 54 having a plurality of axially-extending, upwardly tapered teeth 56 formed on the outer peripheral edge thereof. The teeth 56 taper in an upward direction for a purpose described further below. An inner skirt portion 58 extends downwardly from the upper flanged portion and is sized to help locate and center the outer clamp ring 48 ring within the upper end of the housing 12 on assembly. The upward-facing edge 60 of the flanged portion 54 is grooved at 61 (FIGS. 1 and 2) to receive an increased thickness of the diaphragm outer edge 62, thus facilitating the retention function of the outer clamp ring 48.

Figure 6:
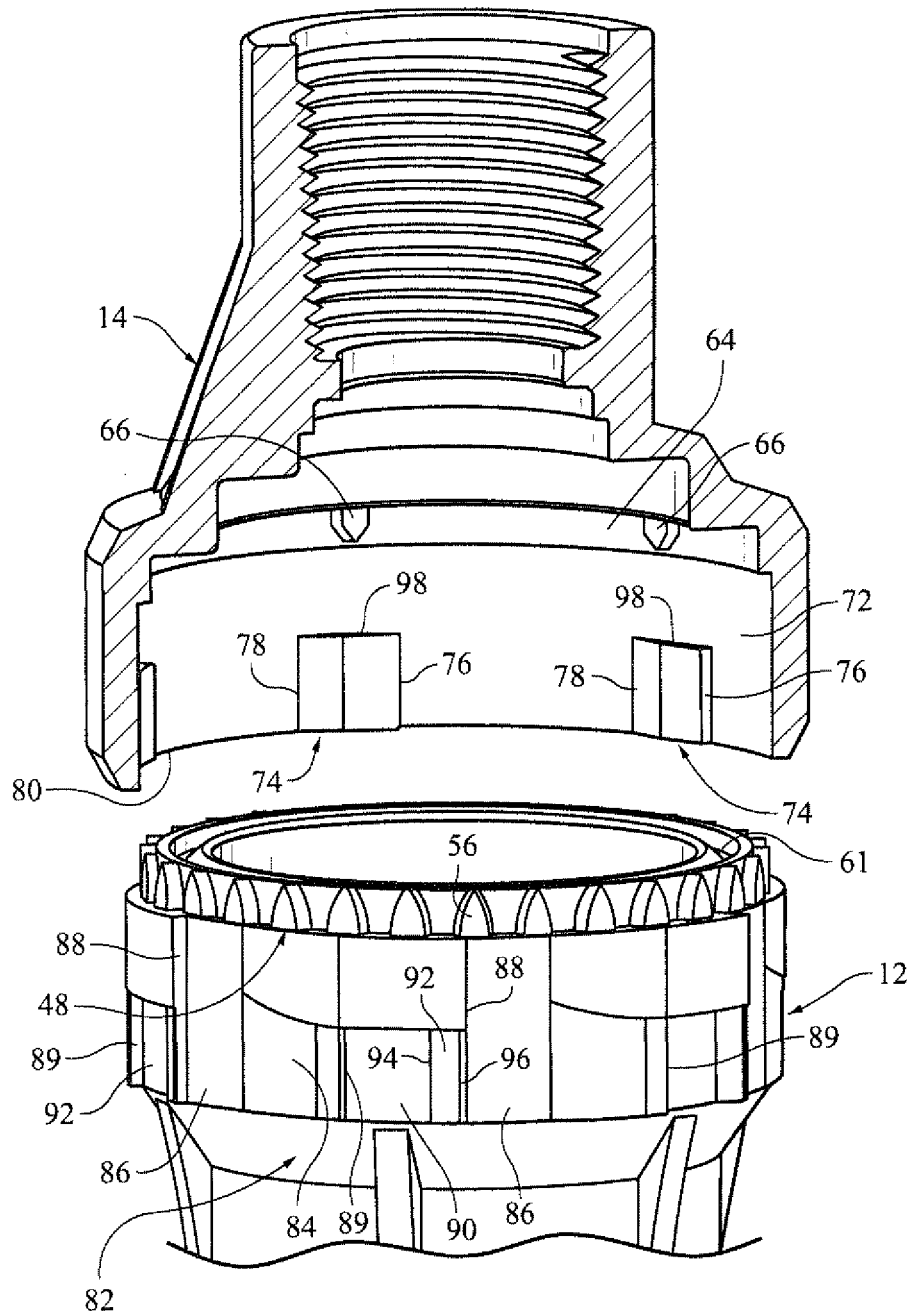
FIG. 6 is an exploded view, partially in section, of the regulator housing and cap, with the plunger-diaphragm assembly omitted.
Figure 7:
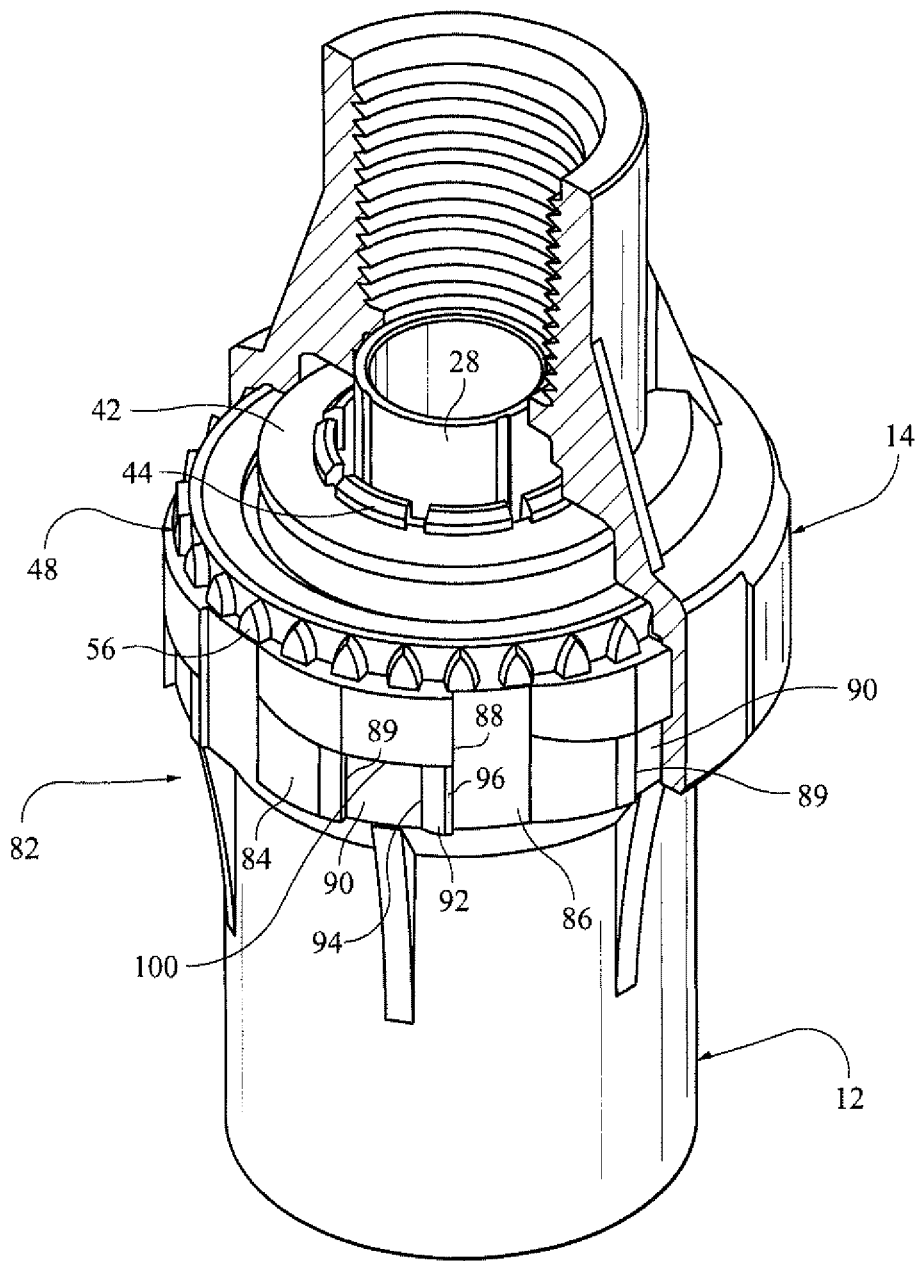
FIG. 7 is a perspective view, partially cut away to show internal details of the regulator housing and cap fully assembled with the plunger-diaphragm assembly in place.
Figure 8:
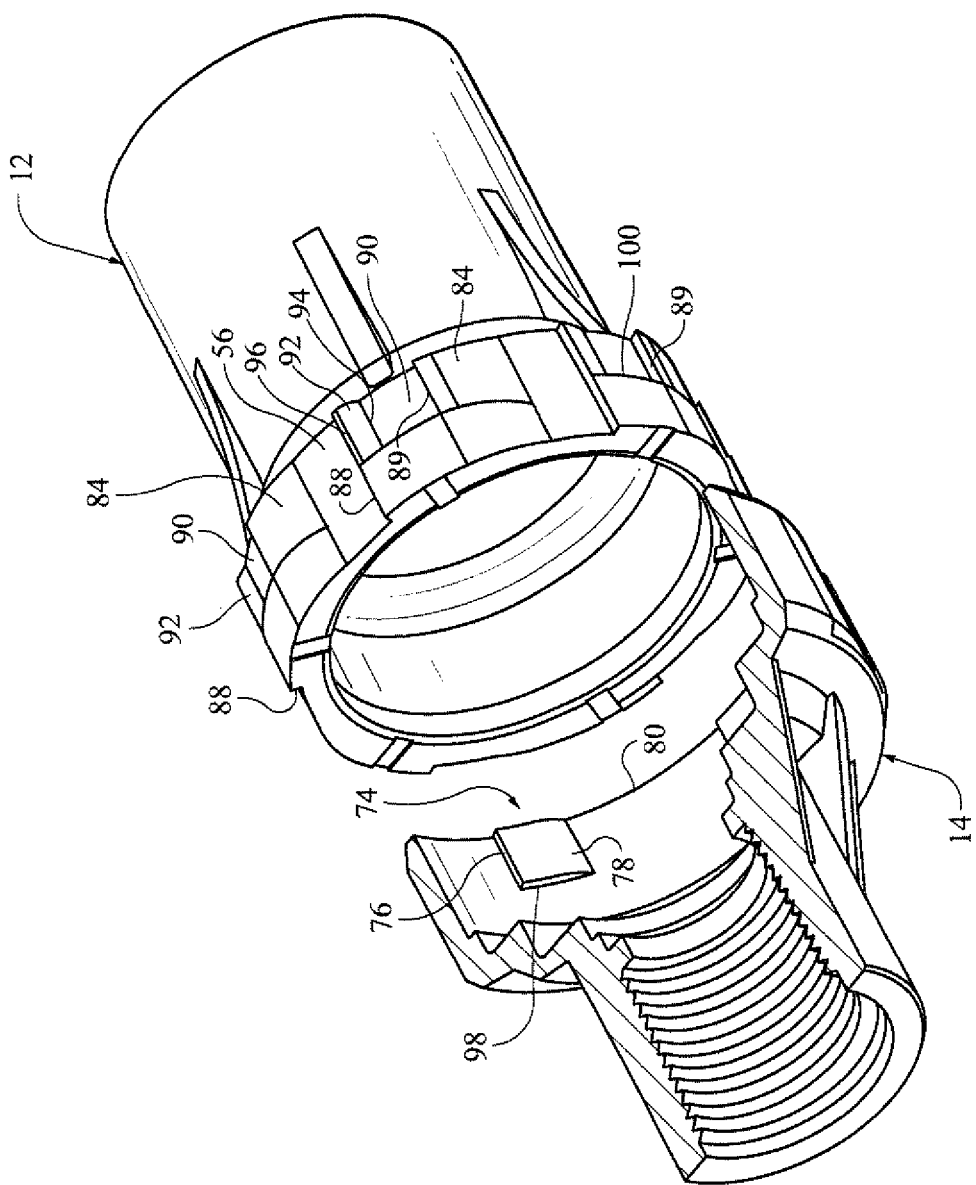
FIG. 8 is an exploded view, partially cut away, showing the cap and housing of the regulator assembly, with the plunger and diaphragm removed.
Figure 9:
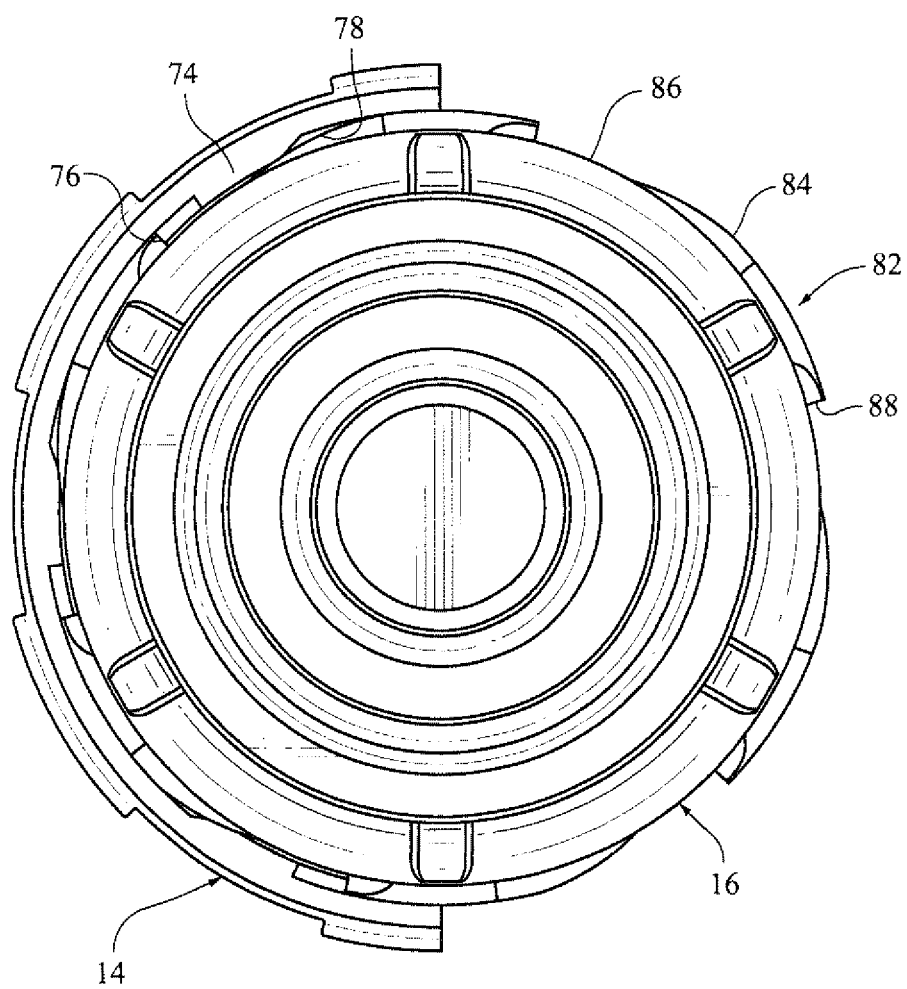
FIG. 9 is a section showing the initial attachment position of the cap and housing prior to being rotated to a locked position.

With reference now to FIG. 6, an inner surface 64 of the cap 14, adjacent the shoulder 24, is provided with a first plurality (six in the illustrated example) of circumferentially-spaced teeth or lugs 66 that project radially inwardly and that are adapted to engage between respective pairs of the teeth 56 on the outer clamp ring 48. During assembly, after locating the plunger-diaphragm assembly 30 in place within the cap 14 (this may be done with the cap inverted relative to its orientation in FIG. 1), when the housing 12 is moved axially into telescoped engagement with the cap 14 as described in greater detail below, the outer clamp ring 48 will orient itself with certain of the teeth 56 engaged with the lugs 66 on the cap inner wall, thus preventing any relative rotation between the outer clamp ring 48 and the cap 14. This meshing engagement is facilitated by the upward taper of the teeth 56. Now, when so located, the outer clamp ring 48 will also seat on the outer peripheral edge 62 of the diaphragm 40 with the thickened diaphragm edge engaged in the groove formed in the upward-facing edge 60. Thus, the outer peripheral edge 62 of the diaphragm 40 is clamped between the shoulder 24 and the outer clamp ring 48, and both the outer clamp ring 48 and diaphragm 40 are prevented from relative rotation with respect to the cap 14. Note also that it is the smooth annular surface 68 on the underside of the outer clamp ring 48 that is engaged by the upper edge 70 of the housing (best seen in FIG. 2) i.e., no part of the diaphragm 40 is exposed to any contact with the housing 12 that, during the locking rotation described below, would otherwise cause torque or twisting action to be applied to the outer edge 62 of the diaphragm.

With reference now especially to FIGS. 6-10, the cap 14 and the housing 12 are formed with cooperating surface features that enable a bayonet-type attachment where the cap 14 is axially-aligned with, and telescoped over, the upper end of the housing 12, and then rotated into locking engagement. More specifically, in the illustrated, nonlimiting embodiment, a lower skirt portion 72 of the cap 14 is formed to include on its interior surface a plurality of circumferentially-spaced and radially-inwardly projecting locking pads 74 (best seen in FIGS. 6 and 8). In the illustrated example, the locking pads 74 are substantially square in shape with a relatively sharp edge 76 on one vertical side thereof, and a sloped or ramped edge 78 on the opposite vertical side thereof. The locking pads 74 are flush with a lower edge 80 of the cap (FIG. 6), and are generally axially-aligned with the lugs 66, although they need not be so aligned.

The outer surface of the housing 12 at the upper end thereof is formed with a plurality of circumferentially-spaced cam platforms 82 (FIGS. 6, 7 and 8), each defined by a cam surface 84 that increases in diameter along a generally arcuate surface extending from a relatively flat base portion 86 to a sharp axial alignment edge 88. These cam platforms are replicated about the circumference of the upper end of the housing 12, thus forming a series of circumferentially-spaced, vertically-extending alignment edges 88. A lower portion of the cam surface 84 for each ratchet tooth is cut out to form a locking recess 90, located proximate the sharp alignment edge 88, the locking recess 90 sized and shaped to receive a corresponding locking pad 74 on the inside of the cap 14 as described above. There is a locking recess 90 in the housing 12 for each locking pad 74 on the cap 14. The circumferential space between the edge of the locking recess 90 and the sharp alignment edge 88 associated with that cam surface is taken up by a relatively small, axially-extending, rib 92 that may have an axially-oriented ramped surface 94 on one side, along the locking recess, and a sharp vertical edge 96 on its other side, in alignment with, and becoming part of the sharp alignment edge 88. The ramped surface 94 on the rib may be included to permit an "over-ride" of the locked arrangement as described further herein.

When the cap 14 and housing 12 are ready for assembly, with the plunger-diaphragm assembly 30 and outer clamp ring 48 properly located, the cap 14 may be telescoped over the housing 12 when the sharp edges 76 of the locking pads 74 are substantially aligned with (but slightly offset from) the sharp alignment edges 88. In this regard, it is noted that, for assembly purposes, the cap may be inverted from the orientation shown in FIG. 1 to facilitate placement of the plunger-diaphragm assembly 30 into the cap. The outer clamp ring 48 can then be located over the outer edge of the diaphragm, with meshing engagement of teeth 56 and lugs 66, followed by insertion of the housing into the cap. Alternatively, after placement of the plunger and diaphragm assembly into the cap, the outer clamp ring 48 can be seated in the housing, relying on the friction fit between the clamp ring skirt portion 58 and the interior surface of the housing to hold the clamp ring 48 as the cap and housing are brought together.

Figure 10:
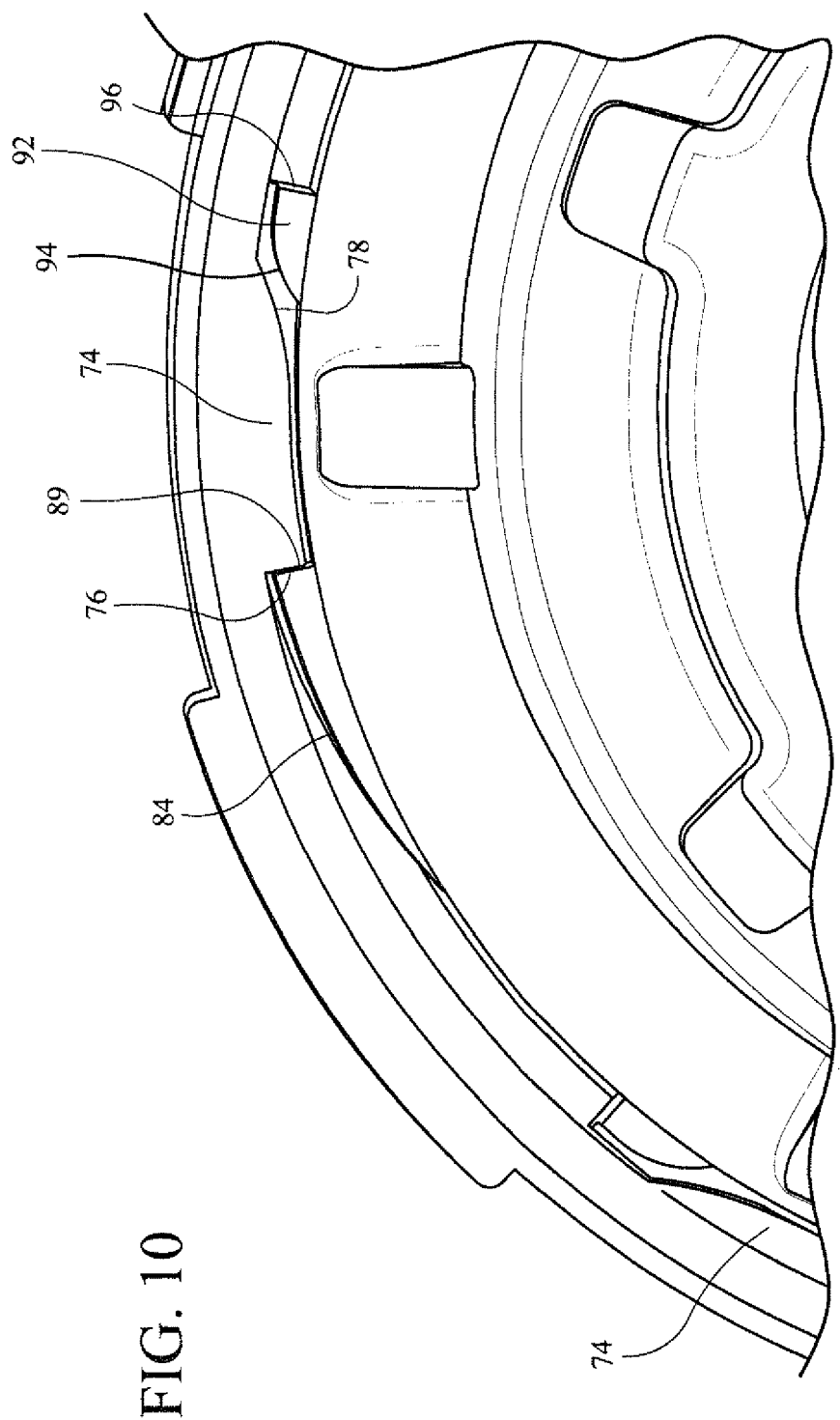
FIG. 10 is a partial enlarged detail from a similar perspective as FIG. 8, but with the cap rotated to a locked position.

Upon full insertion of the upper end of the housing 12 into the cap 14 (see FIGS. 7 and 9), the cap 14 may be rotated such that the locking pads 74 ride over the cam surfaces 84 of the cam platforms 82 and snap or click into the corresponding locking recesses 90, with the sharp edges 76, 89 of the locking pads 74 and locking recesses 90, respectively, preventing any back-rotation of the cap 14 (see FIG. 10). At the same time, the engagement of upper horizontal edges 98 on the locking pads 74 with upper horizontal edges 100 of the locking recesses 90 prevents any further relative axial movement between the cap and the housing.

If the ramped surfaces 94 are employed, it is possible to exert a further rotation force on the cap to move the locking pads out of the locking recesses 90 to enable disassembly of the cap from the housing. On the other hand, if the assembly of the cap to the housing is to be permanent, the ramped surface 94 can be eliminated in favor of a sharp edge like the alignment edge 88. With two sharp edges defining the opposite axial sides of the locking recesses 90, further relative rotation between the cap and the housing is essentially precluded.

As already mentioned, during the relative rotation of the cap 14 and housing 12 during the assembly of one to the other, no torque or twisting forces of any kind are exerted on the diaphragm 40, since the outer clamp ring 48 and diaphragm 40 are fixed relative to the cap 14 and rotational surface friction is established only between the annular surface 68 on the underside of the clamp ring 48 and the upper edge 70 of the lower housing 12.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A pressure regulator housing assembly comprising:
   a lower housing and an upper housing;
   a plunger and diaphragm assembly supported within the lower and upper housings, said plunger movable toward and away from a valve seat, and said diaphragm having a radially inner edge fixed to one end of the plunger and a radially outer edge clamped between an annular surface within said upper housing and a surface of a clamp ring locked against rotation relative to said upper housing thereby isolating said diaphragm from contact with said lower housing;
   wherein, upon assembly of said upper and lower housings requiring relative rotation therebetween, an upper edge of said lower housing is engaged by a lower surface of said clamp ring; and
   wherein an outer peripheral surface of said clamp ring is formed with a first plurality of vertically-oriented, tapered teeth and an inner peripheral wall portion of said upper housing adjacent said annular surface is formed with a second plurality of vertically-oriented teeth engageable, on assembly, with said first plurality of vertically-oriented teeth thereby locking said clamp ring against rotation relative to said upper housing.

2. The pressure regulator housing assembly of claim 1 wherein said first plurality of vertically-oriented teeth are relatively closely spaced said second plurality of vertically-oriented teeth are relatively widely spaced.

3. The pressure regulator housing assembly of claim 1 wherein said first and second pluralities of teeth are tapered in opposite directions to facilitate engagement.

4. A pressure regulator housing assembly comprising:
   a lower housing and an upper housing; and
   a plunger and diaphragm assembly supported within the lower and upper housings, said plunger movable toward and away from a valve seat, and said diaphragm having a radially inner edge fixed to one end of the plunger and a radially outer edge clamped between an annular surface within said upper housing and a surface of a clamp ring locked against rotation relative to said upper housing thereby isolating said diaphragm from contact with said lower housing,
   wherein, upon assembly of said upper and lower housings requiring relative rotation therebetween, an upper edge of said lower housing is engaged by a lower surface of said clamp ring, and wherein an inner peripheral surface of said upper housing is formed with circumferentially-spaced locking pads and an outer peripheral surface of said lower housing is formed with circumferentially-spaced locking recesses which, on axial assembly of the upper and lower housings, are offset from said circumferentially-spaced locking pads and which upon relative rotation between said upper and lower housings, are seated in said circumferentially-spaced locking recesses.

5. The pressure regulator housing assembly of claim 4 wherein said locking recesses are configured to prevent relative axial and rotational movement between said upper and lower housings when said locking pads are seated in said locking recesses.

6. The pressure regulator housing assembly of claim 5 wherein said clamp ring has an upper surface formed with an annular groove for receiving said radially outer edge of said diaphragm.

7. The pressure regulator housing assembly of claim 6 wherein an outer peripheral surface of said clamp ring is formed with first plurality of tapered teeth and an inner peripheral wall portion of said upper housing adjacent said annular surface is formed with a second plurality of teeth engageable, on assembly, with said first plurality of teeth to thereby lock said clamp ring against rotation relative to said upper housing.

8. The pressure regulator housing assembly of claim 7 wherein said first plurality of vertically-oriented teeth are relatively closely spaced said second plurality of vertically-oriented teeth are relatively widely spaced.

9. The pressure regulator housing assembly of claim 7 wherein said first and second pluralities of teeth are tapered in opposite directions to facilitate engagement.

10. A pressure regulator housing assembly comprising:
    a lower housing and an upper housing adapted for assembly via axial engagement and relative rotation;
    a plunger and diaphragm assembly supported within the lower and upper housings, said plunger movable toward and away from a valve seat, and said diaphragm having a radially inner edge fixed to one end of the plunger and a radially outer edge clamped between an annular surface within said upper housing and a surface of a clamp ring;
    wherein an outer peripheral surface of said clamp ring is formed with a first plurality of vertically-oriented, tapered teeth and an inner peripheral wall portion of said upper housing adjacent said annular surface is formed with a second plurality of vertically-oriented teeth engageable, on assembly, with said first plurality of vertically-oriented teeth thereby locking said clamp ring against rotation relative to said upper housing; and
    further wherein an inner peripheral surface of said upper housing is formed with circumferentially-spaced locking pads and an outer peripheral surface of said lower housing is formed with circumferentially-spaced locking recesses which, on axial assembly of the upper housing over the lower housings, are offset from said circumferentially-spaced locking pads and which upon relative rotation between said upper and lower housings, are seated in said circumferentially-spaced locking recesses to thereby lock said upper housing to said lower housing, and wherein during said relative rotation, said diaphragm rotates with said upper housing and an upper edge of said lower housing is engaged by a lower surface of said clamp ring.

11. The pressure regulator housing assembly of claim 10 wherein said clamp ring has an upper surface formed with an annular groove for receiving said radially outer edge of said diaphragm.

12. The pressure regulator housing assembly of claim 10 wherein said first plurality of vertically-oriented teeth are relatively closely spaced said second plurality of vertically-oriented teeth are relatively widely spaced.

13. The pressure regulator housing assembly of claim 10 wherein said first and second pluralities of teeth are tapered in opposite directions to facilitate engagement.

14. The pressure regulator housing assembly of claim 10 wherein said locking recesses are configured to prevent relative axial and rotational movement between said upper and lower housings when said locking pads are seated in said locking recesses.

15. The pressure regulator housing assembly of claim 10 wherein said locking pads are substantially square, with a relatively sharp edge on one vertical side thereof and a ramped edge on an opposite vertical side thereof.

16. The pressure regulator housing assembly of claim 15 wherein the outer peripheral surface of the lower housing is formed with a plurality of circumferentially-spaced cam platforms, each defined by a cam surface that increases in diameter along a generally arcuate surface extending from a relatively flat base portion to a relatively sharp axial alignment edge, a lower portion of the cam surface of each cam platform cut out to form one of said circumferentially-spaced locking recesses located proximate said relatively sharp alignment edge.

17. The pressure regulator housing assembly of claim 16 wherein a space between one edge of the locking recess and said relatively sharp alignment edge is taken up by an axially-extending rib having an axially-oriented ramped surface on one vertical side thereof.

18. The pressure regulator housing assembly of claim 17 wherein said relatively sharp alignment edge comprises an opposite side of said axially-extending rib.

* * * * *